United States Patent

[11] 3,600,090

[72] Inventors Lockett E. Wood;
Moody C. Thompson, Jr., both of Boulder, Colo.
[21] Appl. No. 861,303
[22] Filed Sept. 26, 1969
[45] Patented Aug. 17, 1971
[73] Assignee The United States of America as represented by the Secretary of Commerce

[54] EXTENDED RANGE OPTICAL DISTANCE MEASURING INSTRUMENT
7 Claims, 2 Drawing Figs.

[52] U.S. Cl. .................................................. 356/5, 343/6 R
[51] Int. Cl. ................................................... G01c 3/08
[50] Field of Search .......................................... 356/4, 5; 343/6 IR, 6 A, 6.8

[56] References Cited
UNITED STATES PATENTS
3,034,115  5/1962  Grantham et al. ............. 343/6.8

OTHER REFERENCES
Geodolite, Laser Distance-Measuring Instrument, Model 3, Spectra-Physics, Inc. 3-1968

Primary Examiner—Richard A. Farley
Assistant Examiner—S. C. Buczinski
Attorneys—David Robbins and Alvin J. Englert ABSTRACT: A pair of terminals disposed at opposite ends of a path whose distance is to be measured. The first terminal includes an oscillator for generating a stable frequency signal which is transmitted to the second terminal as modulation on a light beam and as a frequency multiplied radio signal. The second terminal includes a local oscillator whose signal is frequency multiplied and then phase-locked a small interval from the received radio signal. The local oscillator signal (before multiplication) is used to heterodyne the modulation on the received light beam. The multiplied local oscillator signal is radiated to the first terminal where it is mixed with the frequency multiplied stable frequency signal to obtain an intermediate frequency signal that is transmitted back to the second terminal via an auxiliary radio link. The received intermediate frequency signal and the intermediate frequency signals from the phase locking loop and the light heterodyning circuit (after frequency multiplication) are then combined to yield a signal whose phase is proportional to the optical range.

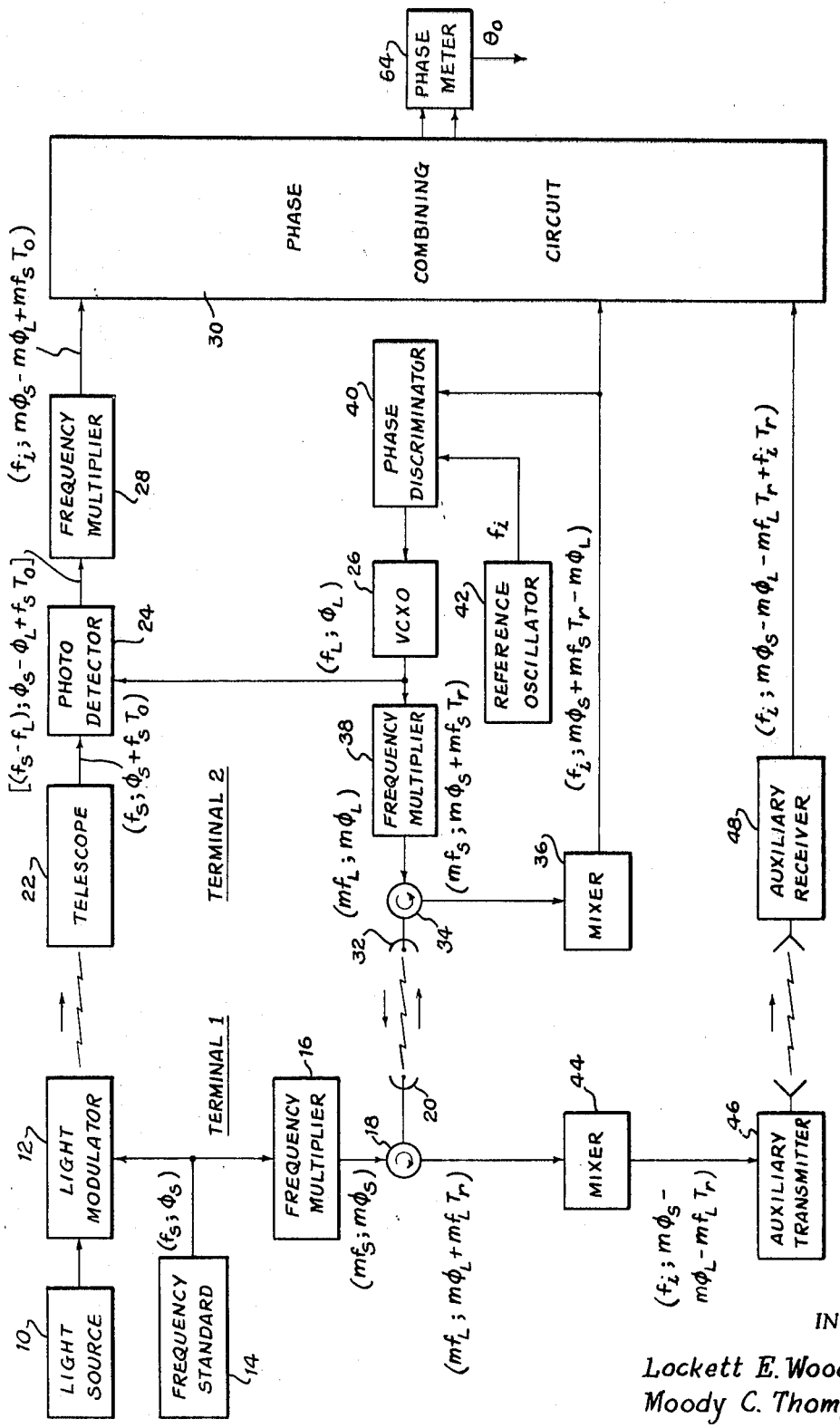

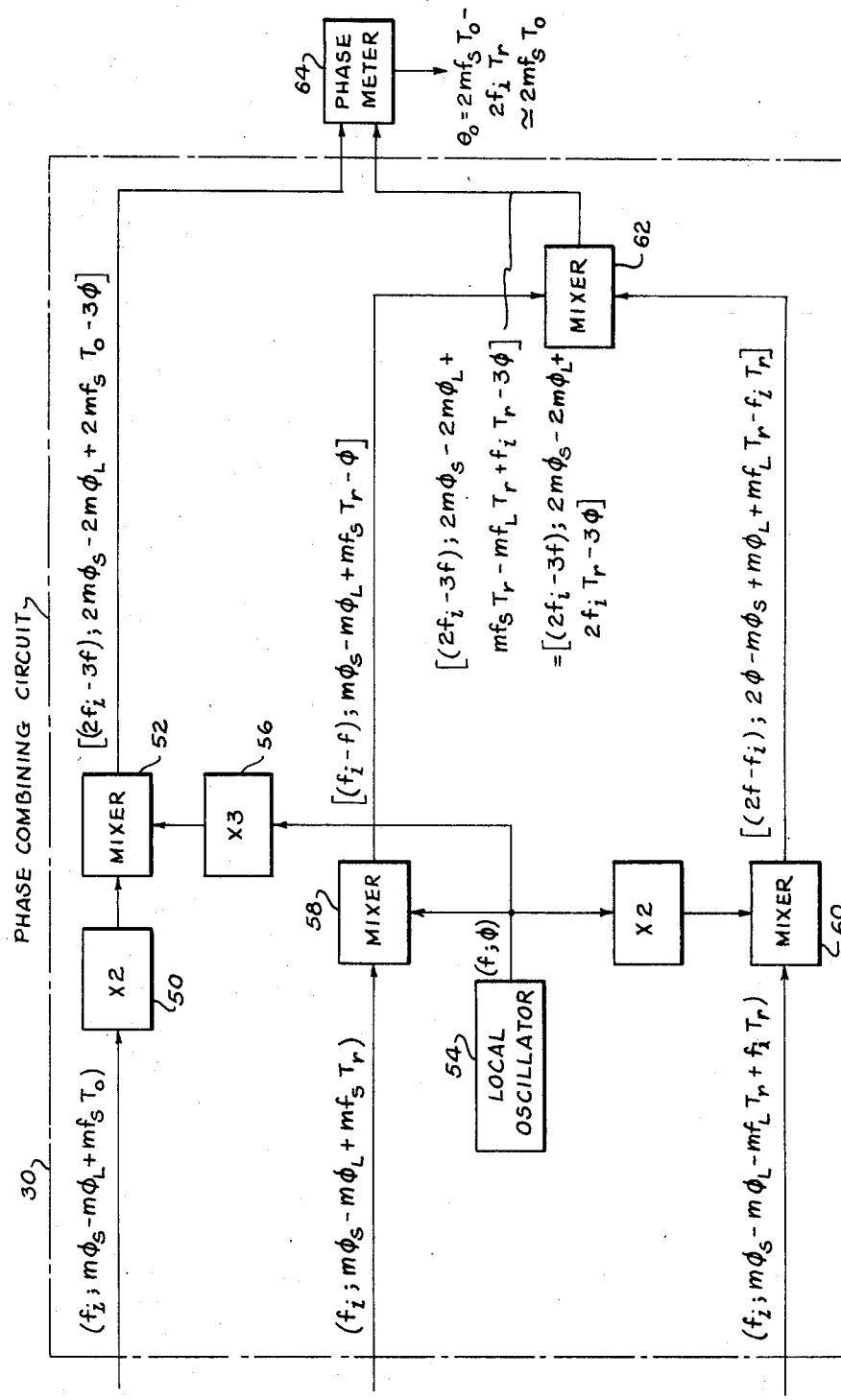

EXTENDED RANGE OPTICAL DISTANCE MEASURING INSTRUMENT

FIELD OF THE INVENTION

This invention related to optical distance measuring instruments and more particularly to an extended range optical distance measuring instrument.

DESCRIPTION OF THE PRIOR ART

The prior art for making optical distance measurements requires transmitting the measuring beam of light across the path and reflecting a portion of the received light back over the path to the original terminal. This technique has two serious disadvantages. First, the loss in intensity of the final received light increases rapidly with path length because of the increased atmospheric absorption, the increased atmospheric scattering, and the divergence of the beam. Second, the degree of amplitude scintillation of the final received light due to atmospheric turbulence is increased because of the second traverse through the atmosphere.

SUMMARY OF THE INVENTION

In the present invention the light beam travels through the atmosphere once, which for ranges of tens or hundreds of kilometers can result in an increase in signal level of tens of decibels. This increase can be used in various ways in designing the instrument, such as reducing the intensity of the light source, decreasing the sensitivity of the photodetector, reducing the size of the optical elements, etc. The first of these possibilities is advantageous when the light source is a laser and it is necessary to reduce the laser's physiological hazard to operating personnel.

The increased signal level due to a single traverse of the path by the light beam can also be used to make distance measurements in regions where seeing conditions are frequently poor. The reduction in light attenuation and scintillation resulting from one-way light transmission enables an instrument using available laser powers and photomultiplier sensitivities to make acceptable measurements under much poorer atmospheric conditions than can be tolerated by the prior art instruments.

Finally, the one-way light transmission employed in accordance with this invention permits high-accuracy measurements over much longer distances than the prior art devices. In rough terrain or in surveying between islands or in obtaining redundancy in geodetic networks, the invention advantageously permits long range measurements (e.g. 100 km.) with accuracies unobtainable with prior art equipment.

BRIEF DESCRIPTION OF THE DRAWING

FIG. 1 is a block diagram of an instrument constructed in accordance with the invention, and FIG. 2 is a block diagram of the phase combining circuit of FIG. 1.

DESCRIPTION OF THE PREFERRED EMBODIMENT

As shown in FIG. 1, the instrument of this invention comprises a pair of terminals located at opposite ends of a path whose distance is to be measured. At the first terminal a beam of light from a laser or other light source 10 is modulated by a light modulator 12 and directed over the path to the second terminal. The light is modulated with a stable frequency signal supplied by a frequency standard 14. The stable frequency signal, of frequency $f_s$ and arbitrary phase angle $\Phi_s$ (written $f_s;\Phi_s$), is multiplied by $m$ in a frequency multiplier 16 to yield a continuous wave radio frequency signal $(mf_s;m\Phi_s)$. This signal is directed by a circulator 18 to an antenna 20 which radiates the signal across the path to the second terminal.

At the second terminal the modulation on the incoming light beam is $(f_s;\Phi_s+f_sT_o)$, where $T_o$ is the optical transit time of the path. The light beam is collected by a telescope 22 and focused onto a suitable photodetector 24 such as a photomultiplier tube, where the modulation is heterodyned with a local oscillator signal $(f_L;\Phi_L)$ from a voltage controlled crystal oscillator (VCXO) 26. The local oscillator signal may be applied to the control grid or the first dynode of the photomultiplier, or to a resonant cavity disposed between the photocathode and first dynode. Alternatively, the modulation could be heterodyned by remodulating the incoming light beam in a light modulator (not shown) with the local oscillator signal $(f_L; \Phi_L)$ and then using a photodetector to obtain the resulting amplitude modulated component. In any case, the result of the heterodyning is a signal $[(f_s-f_L);\Phi_s-\Phi_L+f_sT_o]$. This signal is multiplied by $m$ in a frequency multiplier 28 to provide the first of three intermediate frequency (IF) signals that are applied to a phase combining circuit 30. The multiplied signal is $[(mf_s,mf_L); m\Phi_s-m\Phi_L+mf_sT_o]=(f_i;m\Phi_s-m\Phi_L+mf_sT_o)$, where $f_i=mf_s-mf_L$.

The incoming radio signal at the second terminal is $(mf_s;m\Phi_s+mf_sT_r)$, where $T_r$ is the radio transit time over the path. This signal is received by an antenna 32 and directed by a circulator 34 to a mixer 36. The local oscillator signal $(f_L;\Phi_L)$ is multiplied by $m$ in a frequency multiplier 38 to yield a signal $(mf_L;m\Phi_L)$, part of which is also directed by the circulator 34 to the mixer 36. The received radio signal and the frequency multiplier local oscillator signal are thus mixed to provide the second of the three IF signals fed to circuit 30. The second IF signal is $(f_i;m\Phi_s+mf_sT_r-m\Phi_L)$, where again $f_i=mf_s-mf_L$.

The second IF signal is compared in a phase discriminator 40 with a second signal at $f_i$ obtained from a stable frequency reference oscillator 42. The output of the discriminator 40 is applied as an error signal to the voltage controlled oscillator 26. In this way the frequency multiplied local oscillator signal $(mf_L;m\Phi_L)$ is phase-locked to the received radio signal, but with a small frequency offset of $f_i$.

The signal $(mf_L;m\Phi_L)$ is also radiated by the antenna 32 to the first terminal, becoming $(mf_L;m\Phi_L+mf_LT_r)$. The signal is received by antenna 20 and directed by circulator 18 to mixer 44 where it is mixed with the frequency multiplied stable frequency signal $(mf_s;m\Phi_s)$ to give a signal $(f_i;m\Phi_s-m\Phi_L-mf_LT_r)$. This signal is returned to the second terminal via an auxiliary transmitter 46 and receiver 48; at the second terminal it becomes $(f_i;m\Phi_s-m\Phi_L-mf_LT_r+f_iT_r)$. This signal is the third of the three IF signals applied to circuit 30, which combines the signals to provide a signal whose phase angle $\theta_o$ (from a phase meter 64) is substantially proportional to the optical transit time of the path.

FIG. 2 is a block diagram of the phase combining circuit 30. As shown, the first IF signal $(f_i;m\Phi_s-m\Phi_L+mf_sT_o)$ is doubled in a frequency multiplier 50 and the resultant signal $(2f_i;2m\Phi_s-2m\Phi_L+2mf_sT_o)$ is fed to a mixer 52. A local oscillator signal $(f;\Phi)$ from a source 54 is tripled to $(3f;3\Phi)$ in a multiplier 56 and applied to the mixer 52, to give a first mixer output signal $[(2f_i-3f);2m\Phi_s-2m\Phi_L+2mf_sT_o-3\Phi]$.

The second IF signal $(f_i;m\Phi_s-m\Phi_L+mf_sT_r)$ and the local oscillator signal $(f;\Phi)$ are mixed in a mixer 58 to give a second mixer output signal $[(f_i-f);m\Phi_s-m\Phi_L+mf_sT_r-\Phi]$.

The third IF signal $(f_i;m\Phi_s-m\Phi_L-mf_LT_r+f_iT)$ is mixed in a mixer 60 with twice the local oscillator signal to provide a third mixer output signal $[(2f-f_i);2\Phi-m\Phi_s+m\Phi_L+mf_LT_r-f_iT_r]a$.

The second and third mixer output signals are mixed together in a mixer 62 to provide a fourth mixer output signal $[(2f_i-3f); 2m\Phi_s-2m\Phi_L+mf_sT_r-mf_LT_r+f_iT_r-3\Phi]$, which is $[(2f_i-3f); 2m\Phi_s-2m\Phi L+2f_iT_r-3\Phi]$ since $mf_s=mf_L+f_i$ as before.

This fourth mixer output signal is compared with the first mixer output signal in the phase meter 64 to yield the phase angle output $\theta_o=2mf_sT_o-2f_iT_r$. Since the frequency multiplied stable frequency signal $mf_s$ is always very much larger than the small frequency offset $f_i$, for example $10^5$ larger; and since $T_o$ is approximately equal to $T_r$, the phase angle $\theta_o$ is substantially equal to $2mf_sT_o$, and hence is substantially proportional to the optical transit time $T_o$.

The length of the path L is obtained from the well known relation $$L = (\theta_o \cdot C)/c\bar{n}_o \cdot mf_s)$$

where $C$ is the velocity of light in vacuum, and $\bar{n}_o$ is the correction factor for the path refractive index.

The first mixer output signal has a frequency $(2f_i-3f)$, the second $(f_i-f)$, the third $(2f-f_i)$, and the fourth is the same as the first. In order for these frequencies to be real (positive), the local oscillator frequency must be selected relative to the offset frequency $f_i$ so that $2f_i>3f$, and $2f>f_i$, or $\frac{1}{2}f_i<f<2/3f_i$. For $f_i$ at 80 kHz., $f$ of 50 kHz. satisfies these conditions, and the frequency of the first and fourth signals applied to the phase meter 64, $2f_i-3f$, is 10 kHz.

We claim:

1. An extended range optical distance measuring instrument comprising:
   first and second terminals disposed at opposite ends of a path whose distance is to be measured,
   said first terminal including:
     means for generating a light beam,
     means for generating a stable frequency signal,
     means for modulating said light beam with said stable frequency signal,
     means for directing said modulated light beam over said path to said second terminal,
     means for frequency multiplying said stable frequency signal by $m$, and
     means for radiating said frequency multiplied signal over said path to said second terminal,
   said second terminal including:
     means for receiving said modulated light beam,
     means for generating a first local oscillator signal,
     means for heterodyning said modulation on said received light beam with said first local oscillator signal and for frequency multiplying the resultant signal by $m$ to provide a first intermediate frequency signal,
     means for receiving said radiated frequency multiplied signal,
     means for frequency multiplying said first local oscillator signal by $m$,
     means for mixing said received frequency multiplied signal with said frequency multiplied first local oscillator signal to provide a second intermediate frequency signal,
     means for generating a reference signal of stable frequency equal to said second intermediate frequency,
     means for comparing said second intermediate frequency signal with said reference signal to provide an error signal,
     means for applying said error signal to said first local oscillator signal generating means to lock said frequency multiplied first local oscillator signal to said received signal but with a frequency offset equal to said intermediate frequency, and
     means for radiating said frequency multiplied first local oscillator signal over said path to said first terminal,
   said first terminal further including:
     means for receiving said radiated frequency multiplied first local oscillator signal,
     means for mixing said received signal with said frequency multiplied stable frequency signal and for transmitting the resultant signal over said path to said second terminal via an auxiliary radio transmitter,
   said second terminal further including:
     means for receiving said radio transmitted signal and for obtaining from said received signal a third intermediate frequency signal, and
     means of combining said first, second, and third intermediate frequency signals to provide a signal whose phase is substantially proportional to the optical transit time of said path.

2. An instrument as set forth in claim 1, wherein said signal combining means comprises:
   means for frequency multiplying said first intermediate frequency signal by two,
   means for generating a second local oscillator signal,
   means for frequency multiplying said second local oscillator signal by two and by three,
   means for mixing said frequency doubled first intermediate frequency signal with said frequency tripled second local oscillator signal to provide a first mixer output signal,
   means for mixing said second intermediate frequency signal with said second local oscillator signal to provide a second mixer output signal,
   means for mixing said third intermediate frequency signal with said frequency doubled second local oscillator signal to provide a third mixer output signal,
   means for mixing said second and third mixer output signals to provide a fourth mixer output signal, and
   means for measuring the phase difference between said first and fourth mixer output signals.

3. An instrument as set forth in claim 2, wherein said second local oscillator signal generating means has a frequency between one-half and two-thirds the frequency of said reference signal generating means.

4. An instrument as set forth in claim 1, wherein said means for heterodyning said modulation on said received light beam with said first local oscillator signal comprises a photomultiplier tube having a control grid, said first local oscillator signal being applied to said control grid.

5. An instrument as set forth in claim 1, wherein said means for heterodyning said modulation on said received light beam with said first local oscillator signal comprises a photomultiplier tube, said first local oscillator signal being applied to the first dynode of said tube.

6. An instrument as set forth in claim 1, wherein said means for heterodyning said modulation on said received light beam with said first local oscillator signal comprises a photomultiplier tube having a resonant cavity disposed between the photocathode and first dynode of said tube, said first local oscillator signal being applied to said resonant cavity.

7. An instrument as set forth in claim 1, wherein said means for heterodyning said modulation on said received light beam with said first local oscillator signal comprises means for remodulating said received light beam with said first local oscillator signal, and means for photodetecting the resulting amplitude modulation component having a frequency equal to the difference between said modulation frequency and said first local oscillator signal frequency.